US012572819B2

(12) United States Patent
Katz et al.

(10) Patent No.: US 12,572,819 B2
(45) Date of Patent: Mar. 10, 2026

(54) GENERATING ARTIFICIAL INTELLIGENCE PLANS OF HIGH DIVERSITY

(71) Applicant: INTERNATIONAL BUSINESS MACHINES CORPORATION, Armonk, NY (US)

(72) Inventors: Michael Katz, Goldens Bridge, NY (US); Shirin Sohrabi Araghi, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 948 days.

(21) Appl. No.: 17/805,572

(22) Filed: Jun. 6, 2022

(65) Prior Publication Data

US 2023/0394325 A1 Dec. 7, 2023

(51) Int. Cl.
G06N 3/09 (2023.01)
G06N 3/0499 (2023.01)
G06N 3/08 (2023.01)
G06N 3/126 (2023.01)

(52) U.S. Cl.
CPC .................................... G06N 3/126 (2013.01)

(58) Field of Classification Search
CPC ............................... G06N 3/126; G06N 20/00
See application file for complete search history.

(56) References Cited

U.S. PATENT DOCUMENTS 9,740,978 B2 8/2017 Hassanzadeh
10,831,629 B2 11/2020 Riabov 2013/0132042 A1* 5/2013 Chan ...................... G06N 3/126
703/1
2016/0321544 A1* 11/2016 Hassanzadeh ........ G06F 16/285
2018/0005079 A1* 1/2018 Tosic .................. G06F 18/2414
2019/0340525 A1 11/2019 Katz
2020/0074315 A1 3/2020 Katz
2020/0210532 A1* 7/2020 Matei ...................... G06F 30/00
2020/0265267 A1 8/2020 Galuten
2021/0004741 A1 1/2021 Katz (Continued)

OTHER PUBLICATIONS

"Autonomous Model Learning System for Model Based Solutions in Industrial Plants", An IP.com Prior Art Database Technical Disclosure, IP.com No. IPCOM000264030D, IP.com Electronic Publication Date: Nov. 2, 2020, 5 pages.

(Continued)

*Primary Examiner* — Brandon S Cole

(74) *Attorney, Agent, or Firm* — Rakesh Roy

(57) ABSTRACT

In an approach for improved artificial intelligence planning in an automated machine learning pipeline, a processor formulates an artificial intelligence planning problem. A processor receives a pre-defined stopping criterion for generating one or more plans for the artificial intelligence planning problem. A processor generates the one or more plans by executing a planning algorithm. A processor reformulates the artificial intelligence planning problem into a new artificial intelligence planning problem by forbidding plans that correspond to super-sets of the one or more plans. A processor generates one or more new plans based on the reformulation until the pre-defined stopping criterion is reached.

20 Claims, 7 Drawing Sheets

(56) References Cited

U.S. PATENT DOCUMENTS

| | | | |
|---|---|---|---|
| 2021/0020297 A1* | 1/2021 | Adler | G06N 3/08 |
| 2021/0241866 A1* | 8/2021 | Bhattacharya | G06F 30/10 |

OTHER PUBLICATIONS

"DevOps Robotic Process Automation and Artificial Intelligence Remediation", An IP.com Prior Art Database Technical Disclosure, IP.com No. IPCOM000264994D, IP.com Electronic Publication Date: Feb. 16, 2021, 7 pages.

"L&T blog: About learning, training and technology at ITC-ILO, L&T blog learning about scenario planning and thinking", Apr. 9, 2012, 6 pages, <https://itcilo.wordpress.com/2012/04/09/learning-about-scenario-planning-and-thinking/>.

"System and Method of Goal-Oriented Optimization for Recommendation and Interpretability Based on Process-Aware Automated Machine Learning Pipeline", An IP.com Prior Art Database Technical Disclosure, IP.com No. IPCOM000264527D, IP.com Electronic Publication Date: Dec. 31, 2020, 7 pages.

Berman, Emily, "A Government of Laws and Not of Machines", Boston University Law Review, vol. 98:1277, 2018, 70 pages.

Feblowitz et al., "IBM Scenario Planning Advisor: A Neuro-Symbolic ERM Solution", Association for the Advancement of Artificial Intelligence, 2021, 3 pages, <https://www.aaai.org/AAAI21Papers/DEMO-252.FeblowitzM.pdf>.

Katz et al. "Bounding Quality in Diverse Planning", Proceedings of the 36th AAAI Conference on Artificial Intelligence, Virtual Conference, Feb. 22-Mar. 2, 2022, 8 pages, < https://www.aaai.org/AAAI22Papers/AAAI-9930.KatzM.pdf>.

Katz et al., "A Novel Iterative Approach to Top-к Planning", Proceedings of the Twenty-Eighth International Conference on Automated Planning and Scheduling (ICAPS 2018), Jun. 24-29, 2018, Delft, Netherlands, 9 pages, <https://www.aaai.org/ocs/index.php/ICAPS/ICAPS18/paper/view/17749/16971>.

Katz et al., "Machine Learning Pipeline Generation", U.S. Appl. No. 17/119,134, filed Dec. 11, 2020, 50 pages.

Katz et al., "Reshaping Diverse Planning", Proceedings of the Thirty-Fourth AAAI Conference on Artificial Intelligence (AAAI-20), Feb. 7-12, 2020, New York, New York, 8 pages, <https://ojs.aaai.org/index.php/AAAI/article/view/6543/6399>.

Katz et al., "Top-Quality Planning: Finding Practically Useful Sets of Best Plans", Proceedings of the Thirty-Fourth AAAI Conference on Artificial Intelligence (AAAI-20), Feb. 7-12, 2020, New York, New York, 8 pages, <https://ojs.aaai.org/index.php/AAAI/article/view/6544/6400>.

Katz et al., "Who Needs These Operators Anyway: Top Quality Planning with Operator Subset Criteria", Proceedings of the 32nd International Conference on Automated Planning and Scheduling, Jun. 13-24, 2022, Virtual Conference, 5 pages. Post Disclosure.

Naser, Samy S. Abu, "Predicting Learners Performance Using Artificial Neural Networks in Linear Programming Intelligent Tutoring System", International Journal of Artificial Intelligence & Applications (IJAIA), vol. 3, No. 2, Mar. 2012, 9 pages.

Riabov et al., "Planning-Based Reasoning for Automated Large-Scale Data Analysis", Proceedings of the Twenty-Fifth International Conference on Automated Planning and Scheduling, Jun. 7-11, 2015, Jerusalem, Israel, 9 pages, <https://ojs.aaai.org/index.php/ICAPS/article/view/13689/13538>.

Sohrabi et al. "Scenario Planning for Enterprise Risk Management", Proceedings of the International Conference on Automated Planning and Scheduling (ICAPS 2017), Jun. 18-23, 2017, Pittsburgh, PA, 3 pages.

Sohrabi et al., "Hypothesis Exploration for Malware Detection using Planning", Proceedings of the Twenty-Seventh AAAI Conference on Artificial Intelligence, Jul. 14-18, 2013, Bellevue, WA, 7 pages, <https://www.aaai.org/ocs/index.php/AAAI/AAAI13/paper/view/6080/7288>.

Sohrabi et al., "State Projection via AI Planning", Proceedings of the Thirty-First AAAI Conference on Artificial Intelligence (AAAI-17), Feb. 4-9, 2017, San Francisco, CA, 7 pages, <https://www.aaai.org/ocs/index.php/AAAI/AAAI17/paper/view/14277/13974>.

Spies et al., "Domain-Independent Cost-Optimal Planning in ASP", Cornell University, arXiv, Jul. 31, 2019, 33 pages.

Yu et al., "Learning Search-Space Specific Heuristics Using Neural Network", Proceedings of the 30th International Conference on Automated Planning and Scheduling, Oct. 19-30, 2020, online, 144 pages, <https://icaps20subpages.icaps-conference.org/wp-content/uploads/2020/10/hsdip2020-proceedings.pdf#page=53>.

* cited by examiner

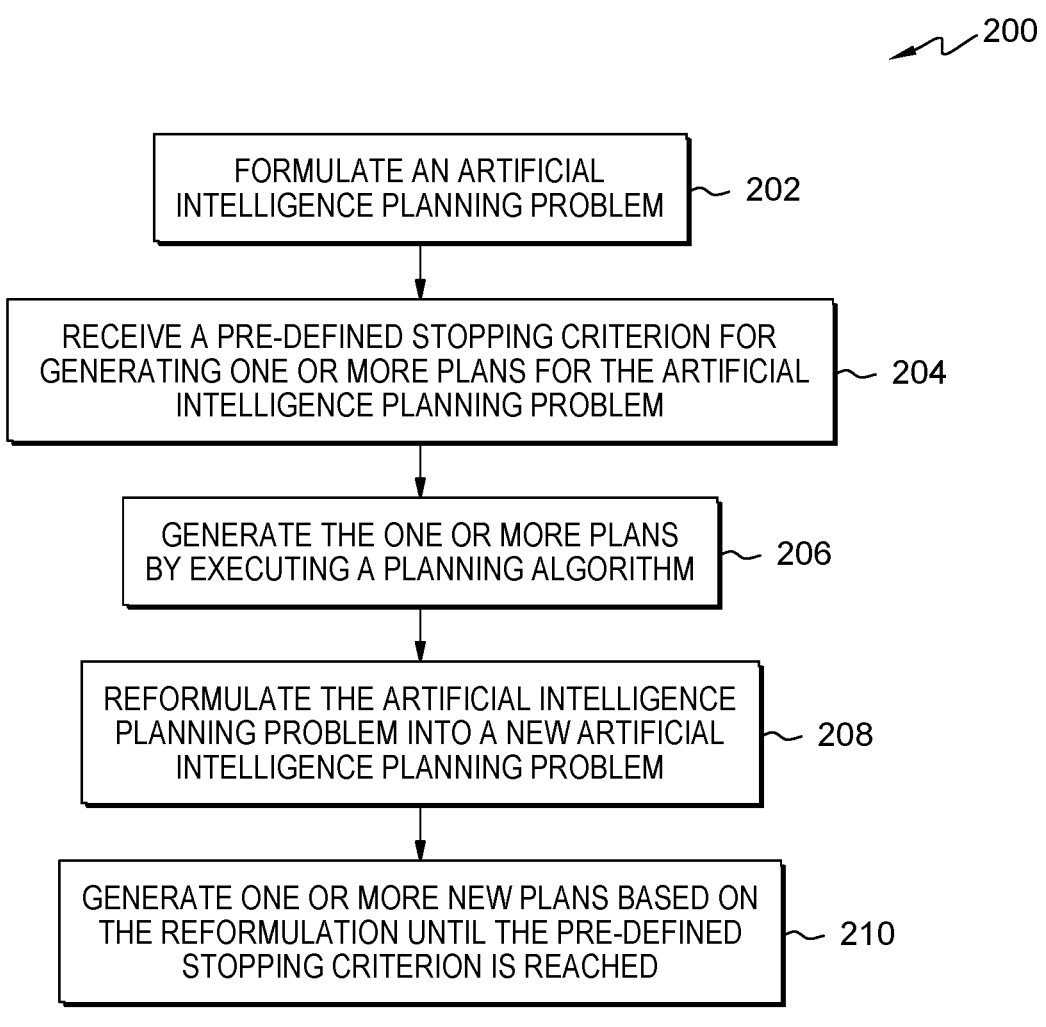

200

FORMULATE AN ARTIFICIAL
INTELLIGENCE PLANNING PROBLEM ～ 202

RECEIVE A PRE-DEFINED STOPPING CRITERION FOR
GENERATING ONE OR MORE PLANS FOR THE ARTIFICIAL
INTELLIGENCE PLANNING PROBLEM ～ 204

GENERATE THE ONE OR MORE PLANS
BY EXECUTING A PLANNING ALGORITHM ～ 206

REFORMULATE THE ARTIFICIAL INTELLIGENCE
PLANNING PROBLEM INTO A NEW ARTIFICIAL
INTELLIGENCE PLANNING PROBLEM ～ 208

GENERATE ONE OR MORE NEW PLANS BASED ON
THE REFORMULATION UNTIL THE PRE-DEFINED
STOPPING CRITERION IS REACHED ～ 210

FIG. 2

| 502<br>Domain | 504<br>top-uQ | 506<br>top-MSQ | 508<br>top-SQ |
|---|---|---|---|
| childsnack14 | 0 | 6 | 6 |
| data-network18 | 0 | 4 | 4 |
| elevator08 | 0 | 2 | 2 |
| gripper | 5 | 16 | 16 |
| miconic | 15 | 17 | 16 |
| movie | 1 | 0 | 0 |
| openstacks08 | 2 | 1 | 1 |
| parcprinter08 | 25 | 24 | 24 |
| parcprinter11 | 18 | 17 | 17 |
| pipesworld-notankage | 8 | 7 | 7 |
| psr-small | 45 | 45 | 47 |
| satellite | 2 | 4 | 4 |
| scanalyzer08 | 4 | 6 | 6 |
| scanalyzer11 | 1 | 3 | 3 |
| sokoban08 | 0 | 0 | 1 |
| storage | 11 | 9 | 10 |
| Sum | 337 | 361 | 364 |

FIG. 5

GENERATING ARTIFICIAL INTELLIGENCE PLANS OF HIGH DIVERSITY

BACKGROUND

The present disclosure relates generally to the field of artificial intelligence, and more particularly to automated planning.

Automated planning is a long-standing sub-area of artificial intelligence that aims at solving problems that involve finding a strategy of action, provided that the problems are modeled in a suitable input language. Automated planning is a branch of artificial intelligence that concerns the realization of strategies or action sequences, typically for execution by intelligent agents, autonomous robots and unmanned vehicles. Unlike classical control and classification problems, the solutions are complex and must be discovered and optimized in multidimensional space. Planning is also related to decision theory. In known environments with available models, planning can be done offline. Solutions can be found and evaluated prior to execution. In dynamically unknown environments, the strategy often needs to be revised online. Models and policies must be adapted. Solutions usually resort to iterative trial and error processes commonly seen in artificial intelligence. These include dynamic programming, reinforcement learning and combinatorial optimization. Languages used to describe planning and scheduling are often called action languages.

Given a description of the possible initial states of the world, a description of the desired goals, and a description of a set of possible actions, the planning problem is to synthesize a plan that is guaranteed (when applied to any of the initial states) to generate a state which contains the desired goals (such a state is called a goal state). The difficulty of planning is dependent on the simplifying assumptions employed. Several classes of planning problems can be identified depending on the properties the problems have in several dimensions.

SUMMARY

Aspects of an embodiment of the present disclosure disclose an approach for improved artificial intelligence planning in an automated machine learning pipeline. A processor formulates an artificial intelligence planning problem. A processor receives a pre-defined stopping criterion for generating one or more plans for the artificial intelligence planning problem. A processor generates the one or more plans by executing a planning algorithm. A processor reformulates the artificial intelligence planning problem into a new artificial intelligence planning problem by forbidding plans that correspond to super-sets of the one or more plans. A processor generates one or more new plans based on the reformulation until the pre-defined stopping criterion is reached.

BRIEF DESCRIPTION OF THE DRAWINGS

FIG. 2 is a flowchart depicting operational steps of a plan generating module within a computing device of FIG. 1, in accordance with an embodiment of the present disclosure.

FIG. 5 illustrates an exemplary experimental evaluation of the plan generating module within the computing device of FIG. 1, in accordance with an embodiment of the present disclosure.

DETAILED DESCRIPTION

Figure 1:
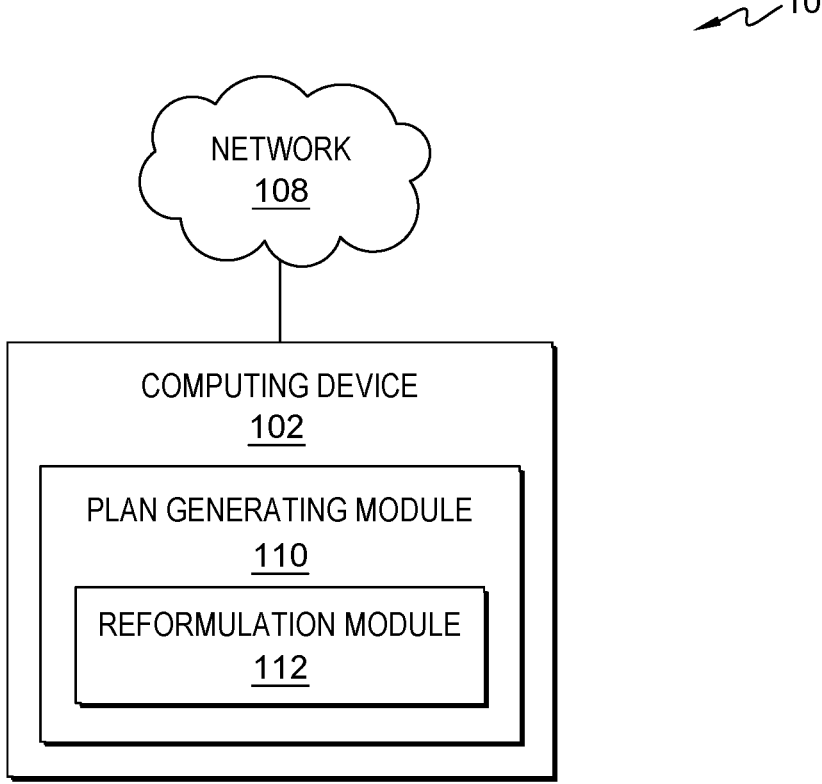
FIG. 1 is a functional block diagram illustrating an automating artificial intelligence pipeline generation environment, in accordance with an embodiment of the present disclosure.

The present disclosure is directed to systems and methods for improved artificial intelligence planning in an automated machine learning pipeline.

Embodiments of the present disclosure recognize a need for automated planning that aims at solving problems that involve finding a course of action (aka plan) provided the problems are modeled in a suitable input language. Embodiments of the present disclosure disclose exploring the space of valid plans, with a focus on diversity of the set of plans, as well as the quality of each individual plan. Embodiments of the present disclosure disclose super-(multi)set top quality planning which skip plans that are supersets of previously found plans. Embodiments of the present disclosure disclose super-(multi)set diverse planning which skip plans that are supersets of previously found plans. In an example, in top quality/diverse planning, many plans are effectively equivalent from the application perspective. For instance, an order in which some actions are performed can make no difference, or additional unnecessary actions can be part of a valid plan. While the unordered top-quality planning may alleviate this problem of indifference regarding action ordering, the unordered top-quality planning may still capture all plans with unnecessary actions, and thus make the set of valid plans prohibitively large and sometimes (unnecessarily) infinite.

Embodiments of the present disclosure disclose exploring the space of valid plans by iteratively finding a plan and reformulating the planning problem to forbid a set of plans. Embodiments of the present disclosure disclose reformulations that forbid plans that, when viewed as (multi)sets of actions, are super(multi)sets of given (multi)sets of actions. These reformulations may work for both the top-quality and diverse settings. Embodiments of the present disclosure disclose systems and methods of improved artificial intelligence planning in an automated machine learning pipeline. Embodiments of the present disclosure disclose receiving an artificial intelligence planning problem and receiving a stopping criterion, the stopping criterion associated with the number of artificial intelligence plans needed or a quality of artificial intelligence plans needed. Embodiments of the present disclosure disclose utilizing a cost-optimal planner to generate an updated solution to the planning problem based on the stopping criterion.

Embodiments of the present disclosure disclose computing a set of top quality or diverse plans, extending the criteria of equivalence from set/multiset equivalence to super- (multi)sets. For example, a plan p would be considered interesting with regarding to an existing set of plans P if p (viewed as a multiset of operators) is not a super-multiset of any plan in P. Embodiments of the present disclosure disclose iterative methods that find a plan, forbid the plan by reformulating the problem and find the next plan by forbidding exactly a plan provided and all its possible super-multisets, or forbidding exactly a collection of plans provided and all their possible super-multisets.

Embodiments of the present disclosure disclose formulating a finite domain representation planning problem (or multiple planning problems). Embodiments of the present disclosure disclose receiving a stopping criterion of either a quality bound or a number of plans or both. Embodiments of the present disclosure disclose running a cost-optimal artificial intelligence to obtain one plan. Embodiments of the present disclosure disclose reformulating a finite domain representation planning problem into a new finite domain representation planning problem so that exactly the found plans and all plans that correspond to super-sets of those plans are forbidden in the iterations. For example, variables may be extended to track the operators on the previously found plans and operator sets checked. Operators may be modified and extended to change the values of extra variables. An initial state may be extended to allocate initial values to the extra variables. A goal may be extended to allocate goal value to the operator sets checking variable.

Embodiments of the present disclosure disclose running a state-of-the-art planner until a stopping criterion is reached: either a plan of worse quality than the quality bound is found, or enough plans were found, or there are no more plans exist. Embodiments of the present disclosure disclose computing a set of diverse plans, where the cost-optimal planner may be replaced by an agile/satisficing planner, that provides a solution of lower cost, but much faster. Embodiments of the present disclosure disclose that the reformulation forbids instead all the found plans and all plans that correspond to super-multisets of those plans. Embodiments of the present disclosure disclose directly enabling a new, improved, scenario planning process. Embodiments of the present disclosure disclose quickly generating plans for multiple modernization workflows. Embodiments of the present disclosure disclose quickly skipping many irrelevant machine learning pipelines.

Embodiments of the present disclosure disclose top-quality planning in general and quotient top-quality planning in particular deal with producing multiple high-quality plans while allowing for their efficient generation, skipping equivalent ones. Embodiments of the present disclosure disclose considering a different relation: two plans are related if one's operator multiset is a subset of the other's. Embodiments of the present disclosure disclose novel reformulations that forbid plans that are related to the given ones. Embodiments of the present disclosure disclose defining a new subset top-quality planning problem, with finite size solution sets, while the new relation is not transitive and thus not an equivalence relation.

Embodiments of the present disclosure disclose a computational problem under the umbrella of top-quality planning that allows to further restrict the solution set. Embodiments of the present disclosure disclose considering the following relation: a plan is related to another if its operator multiset is a subset of the other's. Embodiments of the present disclosure disclose a planning task reformulation that forbids plans whose operator multisets are supersets of the given ones. Embodiments of the present disclosure disclose the solution sets of the new subset top-quality planning problem are of finite size. Embodiments of the present disclosure disclose iteratively finding and forbidding plans, exploiting the new reformulation. Embodiments of the present disclosure disclose a reformulation that forbids plans that are supersets as sets rather than multisets, depicted by top-SQ.

Embodiments of the present disclosure disclose a reformulation that, given a set of plans, forbid all plans that are supersets (as operator multisets) of some plan in the given set. In other words, the reformulation may preserve all plans that are not supersets of all the plans in the given set. That allows for both ignoring plan reorderings and unnecessary operators. Embodiments of the present disclosure disclose the reformulation keeps track of the original operators from the planning task applied on the way to the goal with the extra effects counting the number of applications of each operator applied to reach the goal. Once the goal is reached, if there is an operator with the number of applications lower than the number of appearances in a multiset, then the found plan is not a superset of that multiset. The reformulation may then switch to the second phase in which it ensures that there exists at least one operator from the multiset, whose corresponding operator was not applied and now can be applied.

The present disclosure will now be described in detail with reference to the Figures. FIG. 1 is a functional block diagram illustrating an automating artificial intelligence pipeline generation environment, generally designated 100, in accordance with an embodiment of the present disclosure.

In the depicted embodiment, automating artificial intelligence pipeline generation environment 100 includes computing device 102 and network 108.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to plan generating module 110 and network 108 and is capable of processing program instructions and executing plan generating module 110, in accordance with an embodiment of the present disclosure. Computing device 102 may include internal and external hardware components, as depicted and described in further detail with respect to FIG. 7.

Further, in the depicted embodiment, computing device 102 includes plan generating module 110. In the depicted embodiment, plan generating module 110 is located on computing device 102. However, in other embodiments, plan generating module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and plan generating module 110, in accordance with a desired embodiment of the disclosure.

In one or more embodiments, plan generating module 110 is configured to formulate an artificial intelligence planning problem. Plan generating module 110 may receive the artificial intelligence planning problem for various applications, e.g., a risk management application, an energy domain application, a healthcare application, and a malware detection application. Plan generating module 110 may compute a set of top-quality plans via artificial intelligence planning algorithms. For example, plan generating module 110 may find a strategy of action, provided that the planning problem is modeled in a suitable input language. Plan generating module 110 may find the one best solution to a problem, for example, in a top K planning seeking to find the K best solutions. For example, given quality bound q, the top-quality planning is to find plans with quality under the bound. An unordered top-quality planning is to skip plans that are (multi)set-equivalent to previously found ones. A diverse planning is to find k plans of a particular requirement on diversity (e.g., variety of computational problems), given a bound k on the number of plans and a diversity metric D. In an example, plan generating module 110 may consider two plans are related if one's operator multiset is a subset of the other's. Plan generating module 110 may provide reformulations that forbid plans that are related to the given ones. While the new relation may not be transitive and thus not an equivalence relation, plan generating module 110 may define a new subset top-quality planning problem, with finite size solution sets.

In one or more embodiments, plan generating module 110 is configured to receive a pre-defined stopping criterion for generating one or more plans for the artificial intelligence planning problem. The pre-defined stopping criterion may be associated with one or more of a number of artificial intelligence plans needed or a quality of artificial intelligence plans needed. For example, the pre-defined stopping criterion can be a stopping criterion of either a quality bound or a number of plans or both. Top-quality planning may deal with generating all high-quality plans up to a certain bound. The need for producing such a collection of plans may be established for many applications, including plan recognition, business process automation, and automated machine learning. Top-quality planning may serve as a basis for solving other computational problems, such as quality-aware diverse planning. In these and other applications, the choices of planning models, whether avoidable or not, may have unintended effects on plans. These include (zero-cost) loops, unnecessary repeated operator applications, continuing after the goal is reached. While producing all high-quality plans can be challenging, and even impossible when there are infinitely many such plans, one practical approach suggested to generate all plans that are not equivalent when ignoring operator ordering.

In one or more embodiments, plan generating module 110 is configured to generate one or more plans by executing a planning algorithm (e.g., an artificial intelligence planner). In an example, a planning algorithm can be a cost-optimal planner, an agile planner, a satisficing planner, a top-k planner, a top-quality planner, a diverse planner or any other suitable planner. Plan generating module 110 may obtain a plan by executing the planning algorithm. Plan generating module 110 may utilize a cost-optimal artificial intelligence planner to generate an updated solution to an artificial intelligence planning problem based on a pre-defined stopping criterion. Plan generating module 110 may run a cost-optimal artificial intelligence planner to obtain one plan. In another example, plan generating module 110 may run a top-k planner, a top-quality planner, a diverse planner, an agile planner, a satisficing planner, or any other planner to generate a solution to a planning problem. Plan generating module 110 may compute a set of top-quality plans using a post-process plan by filtering out equivalent or irrelevant plans. Plan generating module 110 may translate the remaining plans into a solution for an application. Plan generating module 110 may compute a set of top quality or diverse plans, extending the criteria of equivalence from set/multiset equivalence to super-(multi)sets.

In one or more embodiments, plan generating module 110 is configured to reformulate an artificial intelligence planning problem into a new artificial intelligence planning problem to forbid plans that correspond to a super set of the plan. Plan generating module 110 may reformulate a finite domain representation planning problem into a new finite domain representation planning problem so that exactly the found plans and all plans that correspond to super-sets of those plans are forbidden in an iteration. For example, plan generating module 110 may extend variables to track operators on the previously found plans and operator sets checked. Plan generating module 110 may modify and extend the operators to change the values of extra variables. Plan generating module 110 may extend an initial state to allocate an initial value to extra variables. Plan generating module 110 may extend a goal to allocate goal value to the operator sets checking variable. Plan generating module 110 may forbid all the found plans and all plans that correspond to super-multisets of those plans. Plan generating module 110 may compute a set of top quality or diverse plans, extending the criteria of equivalence from set/multiset equivalence to super-(multi)sets. Plan generating module 110 may find a plan, forbid the plan by reformulating the problem, and find the next plan. Plan generating module 110 may forbid exactly a plan provided and all the plan's possible super-multisets. Plan generating module 110 may forbidding exactly a collection of plans provided and all their possible super-multisets.

Forbidding Plans as Super-Multisets

In an example, a computational problem of interest as well as a method for solving the problem can be defined as follows. First, let $R_{\subset}=\{(\pi,\pi')|MS(\pi)\subset MS(\pi')\}$ denote the relation defined by the subset operation over plan operator multisets.

Definition 1 (Subset Top-Quality Planning Problem)

Given a planning task $\Pi$ and a natural number q, find a set of plans $P\subseteq P_{\pi s.t.}(i)$. $\forall_\pi\in P$, $\cos(\pi)\leq q$, and (ii) $\forall_{\pi'}\in P_\Pi\backslash P$ with cost with $\cos(\pi)\leq q$, $\exists_\pi\in P_{s.t.}(\pi,\pi')\in R_{\subset}$.

In words, a plan $\pi$ with $\cos(\pi)\leq q$ may not be part of the solution to the subset top-quality planning problem only if its subset is part of the solution. Note, while a top quality and unordered top-quality solutions are also subset top-quality solutions, plan generating module 110 may find smallest (in the number of plans) such solutions. While unordered top-quality solutions can be of infinite size, smallest subset top-quality planning solutions are always finite.

Theorem 1 Given a planning task and a natural number q, a smallest subset top-quality planning problem solution P is of finite size.

Proof: For a plan $\pi$ that contains a cycle, if $\pi'$ is obtained from $\pi$ by removing all cycles, then we have $(\pi,\pi')\in R_{\subset}$. Thus, P is a subset of the set of all cycle-free plans. Since H has only a finite number of states, the number of cycle-free plans is also finite.

Plan generating module 110 may find smallest subset top quality planning problem solutions. Following the line of work on reformulating planning tasks to forbid a set of plans, plan generating module 110 may present a reformulation that, given a set of plans, forbid all plans that are supersets (as operator multisets) of some plan in the given set. In other words, the reformulation preserves all plans that are not supersets of all the plans in the given set. That allows for both ignoring plan reorderings and unnecessary operators. Plan generating module 110 may forbid multiple plans as operator super-multi-sets (FOSMS).

Definition 2 Let $\Pi=(V, O, s_o, s_*, \text{cost})$ be a planning task, $M=\{M_1, \ldots, M_k\}$ be a set of operator multisets, and $U \subseteq O$ be the set of all operators in the multisets in M. The task $(\Pi_M{}^- = \langle V', O', s'_o, s'_*, \text{cost}'\rangle)$ is defined as follows.

$V'=V \cup \{\bar{v}\} \cup \{\bar{v}_o | o \in U\}$, where the variable $\bar{v}$ has the domain $\text{dom}(\bar{v})=\{0 \ldots k\}$ and $\text{dom}(\bar{v}_o)=\{0, \ldots, \overline{m}(o)\}$, where $\overline{m}(o)=\max_{i=1}{}^k\{m_{Mi}(o)\}$, $$O'=\{\bar{o}|o\in O, \quad 0 \le i \le \overline{m}(o)\} \cup \{o_{i,j}|o\in M_j, \quad 1 \le j \le k, \\ 0 \le i < m_{Mi}(o)\}, \text{ where}$$

$$\text{pre}(\bar{o}_i)=\text{pre}(o) \cup \{\langle \bar{v},0 \rangle\} \cup \{\langle \bar{v},i \rangle |o \in U\},$$

$$\text{eff}(\bar{o}_i)=\text{eff}(o) \cup \{\langle \bar{v}_o,i+1 \rangle o \in U, i < \overline{m}(o)\},$$

$$o_{i,j}=\langle s_* \cup \{\langle \bar{v}_o,i \rangle, \langle \bar{v},j-1 \rangle, \{\bar{v},j\} \}\rangle \text{ and}$$

$$\text{cost}'(\bar{o}_i)=\text{cost}(o), \text{cost}'(o_{i,j})=0,$$

$$s'_0=s_0 \cup \{\langle \bar{v},0 \rangle\} \cup \{\langle \bar{v}_o,0 \rangle |o \in U\}, \text{ and}$$

$$s'_*=s_* \cup \{\langle \bar{v},k \rangle\}.$$

In words, the reformulation keeps track of the original operators from the planning task H applied on the way to the goal (i.e., $\bar{o}_i$) with the extra effects counting the number of applications of each operator applied to reach the goal. Once the goal is reached, if there is an operator with the number of applications lower than the number of appearances in a multiset, then the found plan is not a superset of that multiset. The reformulation then switches to the second phase in which it ensures that there exists at least one operator o from the multiset $M_j$, whose corresponding operator $\bar{o}_i$ was not applied and now $o_{i,j}$ can be applied. Note, the goal can only be reached if $\langle \bar{v}, k \rangle$ is true in addition to the original goal $s_*$. That is the goal can be reached by applying the additional operators $o_{i,j}$, which are applicable only when the original goal was achieved and the corresponding original operator was not applied $m_{Mi}(o)$ times.

Algorithm 1: Iterative subset top-quality planning.
Input: Planning task $\Pi$, quality bound q
$P \rightarrow \phi$, $\Pi' \rightarrow \Pi$, $\pi \rightarrow$ shortest cost-optimal plan of $\Pi'$
while $\text{cost}(\pi) \le q$ do
$\quad \pi \rightarrow$ MAPPLANBACK$(\pi)$
$\quad P \rightarrow P \cup \pi \cup \{\pi'|\pi'|\pi, \text{MS}(\pi') \ne \text{MS}(\pi)\}$
$\quad \Pi' \rightarrow \Pi_{M+}{}^-$, where $M=\text{MS}(\pi')|\pi'\in P\}$
$\quad \pi \rightarrow$ shortest cost-optimal plan to $\Pi'$
return P Consider an example task $\Pi$ with $O=\{a, b, c, d\}$, plans aba and ca and their corresponding multisets $M=\{\{a, a, b\}, \{a, c\}\}$. The reformulated task $\Pi_{M+}{}^-$ has extra variables: ternary $\bar{v}$ and $\bar{v}_a$, as well as binary $\bar{v}_b$ and $\bar{v}_c$. O' includes multiple copies of the original operators that appear in U. Here, we have $O'=\bar{a}_0, \bar{a}_1, \bar{a}_2, \bar{b}_0, \bar{b}_1, \bar{c}_0, \bar{c}_1, \bar{d}_0, \cup\{a_{0,1}, a_{0,2}, a_{1,1}, a_{1,2}, b_{0,1}, c_{0,2}\}$. Consider a plan $\pi$=abd for $\Pi$ and a sequence of operators $\bar{\pi}=\bar{a}_0\bar{b}_0\bar{d}_0a_{1,1}c_{0,2}$. Note that $\bar{\pi}$ is a plan for $\Pi_{M+}{}^-$: $\bar{a}_0\bar{b}_0\bar{d}_0$ achieves the original goal, while $a_{1,1}$ and $c_{0,2}$ are changing the value of $\bar{v}$ from 0 to 1 and then to 2. Thus, $\bar{\pi}$ is not forbidden.

To solve the subset top-quality planning problem, one can exploit the reformulation FOSMS in Definition 2, find a plan, extend the plan to a set of plans with the help of structural symmetries, reformulate the original planning task using the set of plans found so far, extend the set by solving the reformulated task optimally, adding the cost optimal plan (and possibly its symmetric plans to the set), continue until there are no more plans of cost lower or equal to q. The detailed scheme is depicted in Algorithm 1.

Theorem 2 Algorithm 1 is sound and complete for subset top-quality planning when using cost-optimal planners that find shortest cost-optimal plans.

Proof: First, according to Theorem 1, Algorithm 1 will terminate and return a set of plans. Let $P=\{\pi_1, \ldots, \pi_k\}$ be plans for $\Pi$ with their corresponding multisets $M=\{\text{MS}(\pi_1), \ldots, \text{MS}(\pi_k)\}$. Let $\pi t=a^1 \ldots a''$ be some plan for $\Pi$ such that $\text{MS}(\pi_i) \not\subseteq \text{MS}(\pi)$ for $1 \le i \le k$. It is shown that there exists a corresponding to $\pi$ plan $\pi$ for $\Pi_{M+}{}^-$. Let $\bar{\pi}_1 = \bar{a}_{l_1}{}^1 \ldots \bar{a}_{l_n}{}''$ be the applicable sequence of operators from O' that corresponds to $\pi=a^1 \ldots a''$ and $s_1$ be the end state of applying $\pi_1$ in $s'_1$. Then, $s_* \subseteq s_1$ and $s_1[\bar{v}]=0$. Since $\text{MS}(\pi_i) \not\subseteq \text{MS}(\pi)$, there exists an operator $b^i \in \text{MS}(\pi_i)$ such that $b^i \notin \text{MS}(\pi)$. Thus, we have $s_1[\bar{v}_{b^i}]=0, 1 \le i \le k$. Then, $\bar{\pi}_2=b_{0,1}{}^1 \ldots b_{0,k}{}^k$ is applicable in $s_1$ and results in a state $s_2$ such that $s_* \subseteq s_2$ and $s_2[\bar{v}]=k$. In other words, $\bar{\pi}=\bar{\pi}_1\bar{\pi}_2$ is a plan for $\Pi_{M+}{}^-$.

The relation $R \cup$ is reflexive, antisymmetric, and transitive and thus defines a partial order over plans. Let $\pi$ and $\pi'$ be two plans such that $(\pi, \pi') \in R \cup$. Then $\text{cost}(\pi) \le \text{cost}(\pi')$ and the plan $\pi$ is strictly shorter than $\pi'$ and therefore a planner that finds shortest among the optimal plans will find $\pi$ before $\pi'$. Thus, Algorithm 1 finds plans that are minimal under the partial order defined by $R \cup$ and will terminate when it finds all such plans of cost less or equal q.

Forbidding Plans as Super-Sets

The reformulation in Definition 2 might in some cases be unnecessarily permissive, allowing plans that are supersets as sets but not as multisets. The stricter reformulation will, therefore, given a set of plans, forbid all plans that are supersets (as operator sets) of some plan in the given set. This may be called as forbidding multiple plans as operator super-sets (FOSS).

Definition 3 Let $\Pi=(V, O, s_o, s_*, \text{cost})$ be a planning task, $X=\{X_1, \ldots, X_k\}$ be a set of operator sets, and $U=\cup_{i=1}{}^k X_i \subset O$ be the union of these sets. The task $\Pi_{X+}{}^- = \langle V', O', s'_o, s'_*, \text{cost}'\rangle$ is defined as follows.

$V'=V \cup \{\bar{v}\} \cup \{\bar{v}_o | o \in U\}$, where the variable $\bar{v}$ has the domain $\text{dom}(\bar{v})=\{0 \ldots k\}$ and all additional variables $\bar{v}_o$ being binary variables, $$O'=\{\bar{o}_i|o\in O\} \cup \{o_i|o\in X_j, 1 \le j \le k\}, \text{ where}$$

$$\bar{o}=\langle \text{pre}(o) \cup \{\langle \bar{v},0 \rangle\}, \text{eff}(o) \cup \{\langle \bar{v}_o,1 \rangle |o \in U\},$$

$$o_i=\langle s_* \cup \{\langle \bar{v}_o,0 \rangle, \langle \bar{v},i-1 \rangle\}, \{\langle \bar{v},i \rangle\}\rangle, \text{ and}$$

$$\text{cost}'(\bar{o}_i)=\text{cost}(o), \text{cost}'(o_{i,j})=0,$$

$$s'_0=s_0 \cup \{\langle \bar{v},0 \rangle\} \cup \{\langle \bar{v}_o,0 \rangle |o \in U\}, \text{ and}$$

$$s'_*=s_* \cup \{\langle \bar{v},k \rangle\}.$$

$X_i$, $1 \le i \le k$ are the operator sets associated with the plans seen so far for the original planning task H. In words, the reformulation keeps track of the original operators from the planning task applied on the way to the goal (i.e., $\bar{o}$) with the extra effect $(\bar{v}_o,1)$ for the operators in the set U, and then switches to the second phase, in which it ensures that there exists at least one operator from the original plans, that was not applied and now can be applied. Note, k is the size of the set X, and the goal can only be reached if $(\bar{v}, k)$ is true in addition to the original goal, $s_*$. Thus, the goal can be reached by applying the additional operators $o_i$, which are applicable only when the original goal was achieved and the corresponding original operator was not applied. Consider the same example planning task $\Pi$ over operators $O=\{a, b, c, d\}$, the same two plans aba and ca and their corresponding sets $X=\{\{a, b\}, \{a, c\}$. The reformulated task $\Pi_{X+}^-$ would then have extra ternary variable $\bar{v}$ and binary variables $\bar{v}_a, \bar{v}_b$ and $\bar{v}_c$. O' includes multiple copies of the original operators that appear in U. Here, there is $O'=\{\bar{a}, \bar{b}, \bar{c}, \bar{d}\} \cup \{a_1, a_2, b_1c_2\}$. Consider again the plan $\pi=$abd for $\Pi$ and a sequence of operators $\bar{\pi}=\overline{abd}$. Applying $\bar{\pi}$ to the initial state of $\Pi_{X+}^-$ results in a state $s'_*=s_* \cup \{\langle\bar{v},0\rangle, \langle\bar{v}_a,1\rangle, \langle\bar{v}_b,1\rangle, \langle\bar{v}_c,0\rangle, \langle\bar{v}_d,1\rangle\}$. Note that none of $\{a_1, a_2, b_1c_2\}$ operators are applicable in s' and therefore there is no corresponding to $\pi$ plan of $\Pi_{X+}^-$. Observe that the reformulation, while forbidding plans that are supersets of elements in X, allows plans that are proper subsets of these sets in X. For example, a plan abc is a superset (as operator set) of aba. Assuming the reformulation is used within Algorithm 1, if aba is found first, abc is forbidden, but not vice versa. Thus, Algorithm 1 can be slightly adapted to check whether the newly found plans are subsets of previously found ones, discarding the plans that are supersets. Note that this could not happen in the case of Definition 2, since a plan that corresponds to a proper subset (as multiset) of another one will be found earlier.

It is worth noting here that in some cases FOSS might be preferred over FOSMS or vice versa. One example of such a case is whether it is important to differentiate alternative but similar ways of achieving subgoals.

In one or more embodiments, plan generating module 110 is configured to generate one or more new plans based on the reformulation until the pre-defined stopping criterion is reached. Plan generating module 110 may run until a stopping criterion is reached: either a plan of worse quality than the quality bound is found, or enough plans were found, or there are no more plans exist. In an example, plan generating module 110 may generate a subset top-quality solution in domain with infinite size unordered top-quality solutions. Plan generating module 110 may utilize a cost-optimal planner to generate an updated solution to the artificial intelligence planning problem based on the pre-defined stopping criterion. Plan generating module 110 may solve a computational problem under the umbrella of top-quality planning that allows to further restrict the solution set. Plan generating module 110 may consider the following relation: a plan is related to another if its operator multiset is a subset of the other's. Plan generating module 110 may provide a planning task reformulation that forbids plans whose operator multisets are supersets of the given ones. Plan generating module 110 may prove that the solution sets of the new subset top-quality planning problem are of finite size. Plan generating module 110 may iteratively find and forbid plans and may exploit the new reformulation. Plan generating module 110 may provide a reformulation that forbids plans that are supersets as sets rather than multisets, depicted by top-SQ. This stricter reformulation top-SQ, can be preferred if it is important to forbid alternative but similar ways of achieving subgoals. Plan generating module 110 may generate subset top-quality solutions in domains with infinite size unordered top-quality solutions. While each of the approaches to top-quality planning has its own motivating scenario, the two new ones show a great promise, particularly in domains with redundant and zero-cost operators. Plan generating module 110 may prove that these solutions can be obtained by exploiting the proposed reformulations. The solution sizes significantly decrease, making the new approach more practical, particularly in domains with redundant operators. Plan generating module 110 may implement a diverse planner on top of a forbid iterative planner collection, on top of a fast downward planning system. Plan generating module 110 may improving the performance of various planners, possibly by reusing information from one iteration for the next one.

Further, in the depicted embodiment, plan generating module 110 includes reformulation module 112. In the depicted embodiment, reformulation module 112 is located on plan generating module 110 and computing device 102. However, in other embodiments, reformulation module 112 may be located externally and accessed through a communication network such as network 108.

In one or more embodiments, reformulation module 112 is configured to reformulate a planning problem into a new planning problem to forbid plans that correspond to a super set of the plan. Reformulation module 112 may find a plan, forbid the plan by reformulating the problem and find the next plan. Reformulation module 112 may forbid exactly a plan provided and all its possible super-multisets. Reformulation module 112 may forbid exactly a collection of plans provided and all their possible super-multisets. Reformulation module 112 may reformulate a finite domain representation planning problem into a new finite domain representation planning problem so that exactly the found plans and all plans that correspond to super-sets of those plans are forbidden in an iteration. For example, reformulation module 112 may extend variables to track operators on the previously found plans and operator sets checked. Reformulation module 112 may modify and extend the operators to change the values of extra variables. Reformulation module 112 may extend an initial state to allocate an initial value to extra variables. Reformulation module 112 may extend a goal to allocate goal value to the operator sets checking variable. Reformulation module 112 may forbid all the found plans and all plans that correspond to super-multisets of those plans. Reformulation module 112 may compute a set of top quality or diverse plans, extending the criteria of equivalence from set/multiset equivalence to super-(multi)sets. Reformulation module 112 may find a plan, forbid the plan by reformulating the problem, and find the next plan. Reformulation module 112 may forbid exactly a plan provided and all the plan's possible super-multisets. Reformulation module 112 may forbid exactly a collection of plans provided and all their possible super-multisets.

FIG. 2 is a flowchart 200 depicting operational steps of plan generating module 110 in accordance with an embodiment of the present disclosure.

Plan generating module 110 operates to formulate an artificial intelligence planning problem. Plan generating module 110 may receive the artificial intelligence planning problem for various applications, e.g., a risk management application, an energy domain application, a healthcare application, and a malware detection application. Plan generating module 110 also operates to receive a pre-defined stopping criterion for generating one or more plans for the artificial intelligence planning problem. The pre-defined stopping criterion may be associated with one or more of a number of artificial intelligence plans needed or a quality of artificial intelligence plans needed. Plan generating module 110 operates to generate one or more plans by executing a planning algorithm (e.g., an artificial intelligence planner). Plan generating module 110 operates to reformulate an artificial intelligence planning problem into a new artificial intelligence planning problem to forbid plans that correspond to a super set of the plan. Plan generating module 110 operates to generates one or more new plans based on the reformulation until the pre-defined stopping criterion is reached.

In step 202, plan generating module 110 formulates an artificial intelligence planning problem. Plan generating module 110 may receive the artificial intelligence planning problem for various applications, e.g., a risk management application, an energy domain application, a healthcare application, and a malware detection application. Plan generating module 110 may compute a set of top-quality plans via artificial intelligence planning algorithms. For example, plan generating module 110 may find a strategy of action, provided that the planning problem is modeled in a suitable input language. Plan generating module 110 may find the one best solution to a problem, for example, in a top K planning seeking to find the K best solutions. For example, given quality bound q, the top-quality planning is to find plans with quality under the bound. An unordered top-quality planning is to skip plans that are (multi)set-equivalent to previously found ones. A diverse planning is to find k plans of a particular requirement on diversity (e.g., variety of computational problems), given a bound k on the number of plans and a diversity metric D. In an example, plan generating module 110 may consider two plans are related if one's operator multiset is a subset of the other's. Plan generating module 110 may provide reformulations that forbid plans that are related to the given ones. While the new relation may not be transitive and thus not an equivalence relation, plan generating module 110 may define a new subset top-quality planning problem, with finite size solution sets.

In step 204, plan generating module 110 receives a pre-defined stopping criterion for generating one or more plans for the artificial intelligence planning problem. The pre-defined stopping criterion may be associated with one or more of a number of artificial intelligence plans needed or a quality of artificial intelligence plans needed. For example, the pre-defined stopping criterion can be a stopping criterion of either a quality bound or a number of plans or both. Top-quality planning may deal with generating all high-quality plans up to a certain bound. The need for producing such a collection of plans may be established for many applications, including plan recognition, business process automation, and automated machine learning. Top-quality planning may serve as a basis for solving other computational problems, such as quality-aware diverse planning. In these and other applications, the choices of planning models, whether avoidable or not, may have unintended effects on plans. These include (zero-cost) loops, unnecessary repeated operator applications, continuing after the goal is reached. While producing all high-quality plans can be challenging, and even impossible when there are infinitely many such plans, one practical approach suggested to generate all plans that are not equivalent when ignoring operator ordering.

In step 206, plan generating module 110 generates one or more plans by executing a planning algorithm (e.g., an artificial intelligence planner). In an example, a planning algorithm can be a cost-optimal planner, an agile planner, a satisficing planner, a top-k planner, a top-quality planner, a diverse planner or any other suitable planner. Plan generating module 110 may obtain a plan by executing the planning algorithm. Plan generating module 110 may utilize a cost-optimal artificial intelligence planner to generate an updated solution to an artificial intelligence planning problem based on a pre-defined stopping criterion. Plan generating module 110 may run a cost-optimal artificial intelligence planner to obtain one plan. In another example, plan generating module

110 may run a top-k planner, a top-quality planner, a diverse planner, an agile planner, a satisficing planner, or any other planner to generate a solution to a planning problem. Plan generating module 110 may compute a set of top-quality plans using a post-process plan by filtering out equivalent or irrelevant plans. Plan generating module 110 may translate the remaining plans into a solution for an application. Plan generating module 110 may compute a set of top quality or diverse plans, extending the criteria of equivalence from set/multiset equivalence to super-(multi)sets.

In step 208, plan generating module 110 reformulates an artificial intelligence planning problem into a new artificial intelligence planning problem to forbid plans that correspond to a super set of the plan. Plan generating module 110 may reformulate a finite domain representation planning problem into a new finite domain representation planning problem so that exactly the found plans and all plans that correspond to super-sets of those plans are forbidden in an iteration. For example, plan generating module 110 may extend variables to track operators on the previously found plans and operator sets checked. Plan generating module 110 may modify and extend the operators to change the values of extra variables. Plan generating module 110 may extend an initial state to allocate an initial value to extra variables. Plan generating module 110 may extend a goal to allocate goal value to the operator sets checking variable. Plan generating module 110 may forbid all the found plans and all plans that correspond to super-multisets of those plans. Plan generating module 110 may compute a set of top quality or diverse plans, extending the criteria of equivalence from set/multiset equivalence to super-(multi)sets. Plan generating module 110 may find a plan, forbid the plan by reformulating the problem, and find the next plan. Plan generating module 110 may forbid exactly a plan provided and all the plan's possible super-multisets. Plan generating module 110 may forbidding exactly a collection of plans provided and all their possible super-multisets.

In step 210, plan generating module 110 generates one or more new plans based on the reformulation until the pre-defined stopping criterion is reached. Plan generating module 110 may run until a stopping criterion is reached: either a plan of worse quality than the quality bound is found, or enough plans were found, or there are no more plans exist. In an example, plan generating module 110 may generate a subset top-quality solution in domain with infinite size unordered top-quality solutions. Plan generating module 110 may utilize a cost-optimal planner to generate an updated solution to the artificial intelligence planning problem based on the pre-defined stopping criterion. Plan generating module 110 may solve a computational problem under the umbrella of top-quality planning that allows to further restrict the solution set. Plan generating module 110 may consider the following relation: a plan is related to another if its operator multiset is a subset of the other's. Plan generating module 110 may provide a planning task reformulation that forbids plans whose operator multisets are supersets of the given ones. Plan generating module 110 may prove that the solution sets of the new subset top-quality planning problem are of finite size. Plan generating module 110 may iteratively find and forbid plans and may exploit the new reformulation. Plan generating module 110 may provide a reformulation that forbids plans that are supersets as sets rather than multisets, depicted by top-SQ. This stricter reformulation top-SQ, can be preferred if it is important to forbid alternative but similar ways of achieving subgoals. Plan generating module 110 may generate subset top-quality solutions in domains with infinite size unordered top-quality solutions. While each of the approaches to top-quality planning has its own motivating scenario, the two new ones show a great promise, particularly in domains with redundant and zero-cost operators. Plan generating module 110 may prove that these solutions can be obtained by exploiting the proposed reformulations. The solution sizes significantly decrease, making the new approach more practical, particularly in domains with redundant operators.

Plan generating module 110 may implement a diverse planner on top of a forbid iterative planner collection, on top of a fast downward planning system. Plan generating module 110 may improving the performance of various planners, possibly by reusing information from one iteration for the next one.

Figure 3:
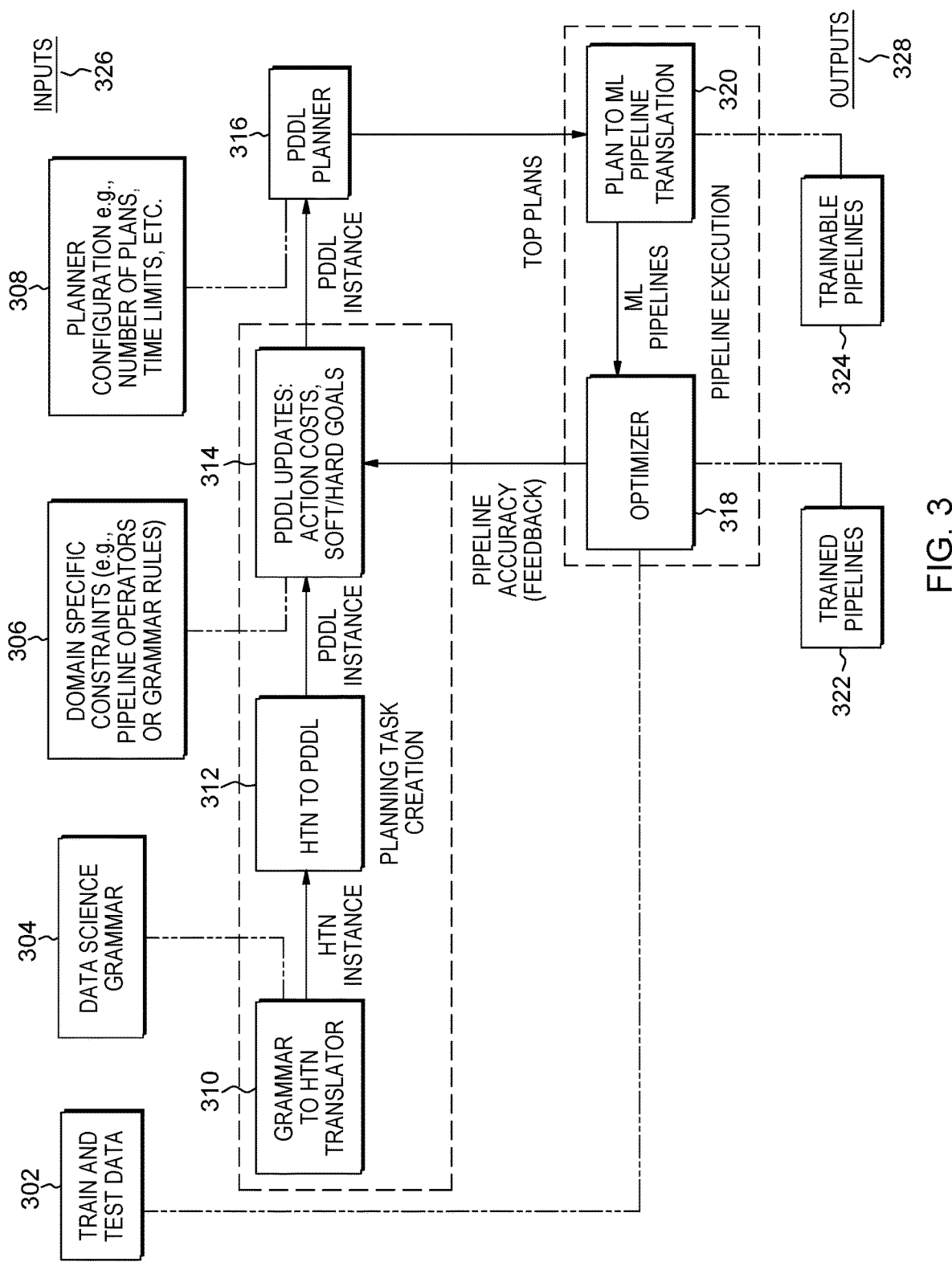
FIG. 3 illustrates an exemplary functional diagram of the plan generating module within the computing device of FIG. 1, in accordance with an embodiment of the present disclosure.

FIG. 3 illustrates an exemplary functional diagram of plan generating module 110 in automating artificial intelligence pipeline generation environment 100, in accordance with an embodiment of the present disclosure.

In the example of FIG. 3, inputs 326 includes training and test data 302, data science grammar 304, domain specific constraints 306 and planner configuration 308. Outputs 328 includes trained pipelines 322 and trainable pipelines 324. Automating artificial intelligence pipeline generation environment 100 also includes grammar to HTN (Hierarchical Task Network) translator 310, HTN to PDDL (Planning Domain Definition Language) 312, PDDL updates 314, PDDL planner 316 (e.g., plan generating module 110), optimizer 318 and plan to machine learning pipeline 320.

Figure 4:
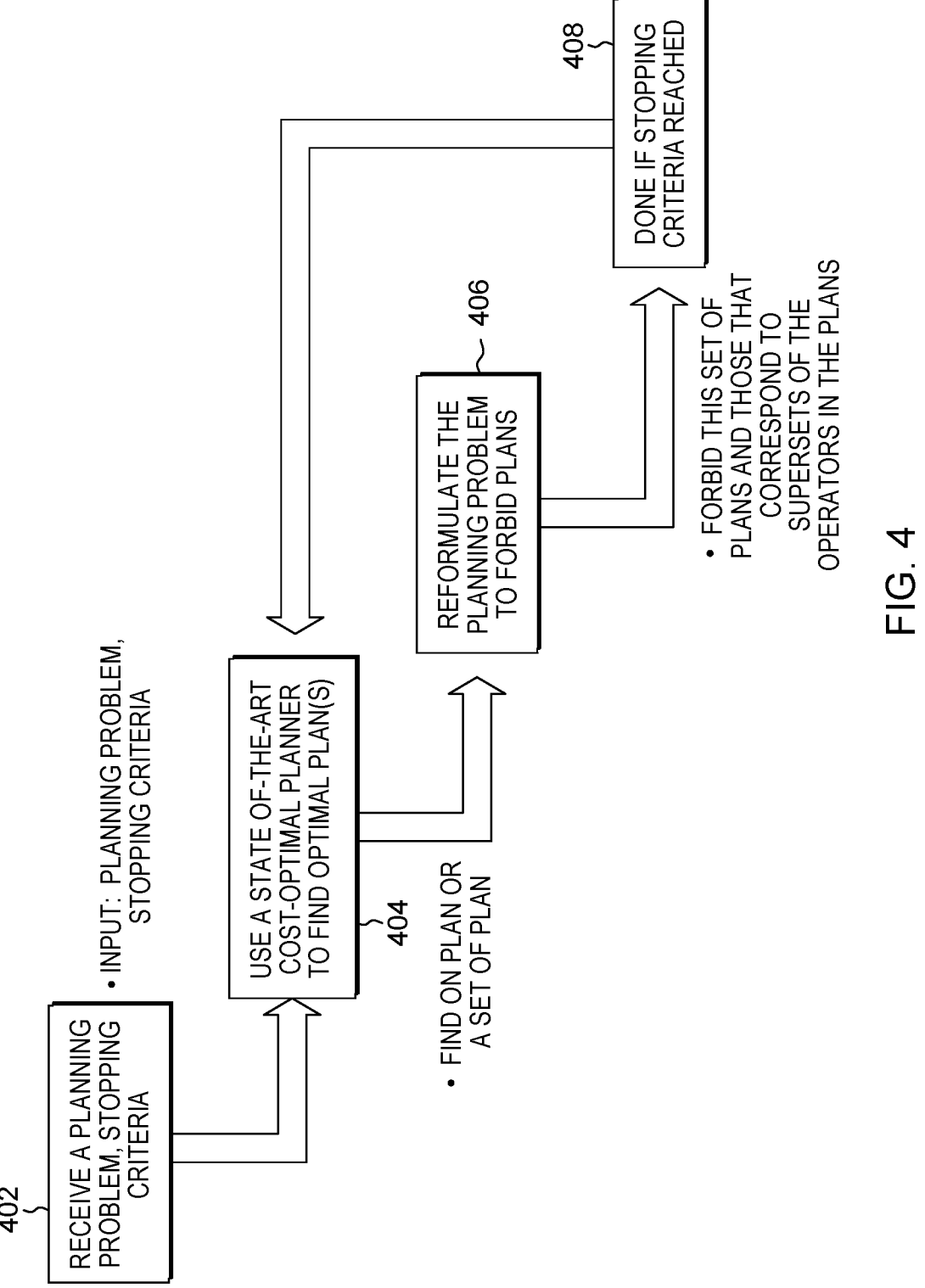
FIG. 4 illustrates exemplary operational steps of the plan generating module of FIG. 1, in accordance with an embodiment of the present disclosure.

FIG. 4 illustrates exemplary operational steps of plan generating module 110 in accordance with an embodiment of the present disclosure.

In the example of FIG. 4, at block 402, plan generating module 110 receives a planning problem and stopping criteria as an input. At block 404, plan generating module 110 uses a state of-the-art cost-optimal planner to find optimal plan(s). Plan generating module 110 may find one plan or a set of plans. At block 406, plan generating module 110 reformulates the planning problem to forbid plans. Plan generating module 110 may forbid this set of plans and those that correspond to supersets of the operators in the plans. At block 408, plan generating module 110 stops running until the stopping criteria is reached, e.g., either a plan of worse quality than the quality bound is found, or enough plans were found, or there are no more plans exist.

FIG. 5 illustrates an exemplary experimental evaluation of plan generating module 110 about per-domain coverage for configurations, in accordance with an embodiment of the present disclosure.

In the example of FIG. 5, to empirically evaluate the feasibility of the approach, plan generating module 110 may implement diverse planners on top of a forbid iterative planner collection and a fast downward planning system. The two example reformulations depicted in Definition 2 (denoted by top-MSQ 506) and Definition 3 (denoted by top-SQ 508) are compared to the unordered top-quality planning (top-uQ 504). The evaluation may focus on cost-optimal plans, e.g., q=1. FIG. 5 depicts the per-domain coverage of the three approaches, with the largest coverage bolded. A planner gets coverage of 1 for a task if it was able to find the solution for its corresponding computational problem. For top-uQ 504 it means finding all cost-optimal plans up to reordering. For top-MSQ 506 (top-SQ 508) it means finding all cost-optimal plans up to submultiple-sets (subsets). While on most of the 64 domains 502 there is no change in the coverage, there are 16 domains depicted in FIG. 5 where the coverage differs. Note that the overall coverage significantly increases compared to the baseline, for both approaches. There are four domains 502 where the previous approach could not solve any task, but the current proposed approach can. Out of these, elevators and Sokoban could not be solved by the previous approach in principle, as the unordered top-quality solution has an infinite number of plans. The superset top-quality one is however finite in these domains. Still, in a few domains (e.g., movie, openstacks, parcprinter, pipesworld, storage) the baseline top-uQ still dominates. The corresponding reformulation is simpler than the suggested ones, and therefore the classical planners are expected to be able to solve these reformulated tasks quicker. If the number of iterations does not (significantly) decrease when attempting to forbid more plans, the baseline should perform better than the proposed approaches. These new suggested approaches thrive when the solution size decreases significantly.

Figure 6:
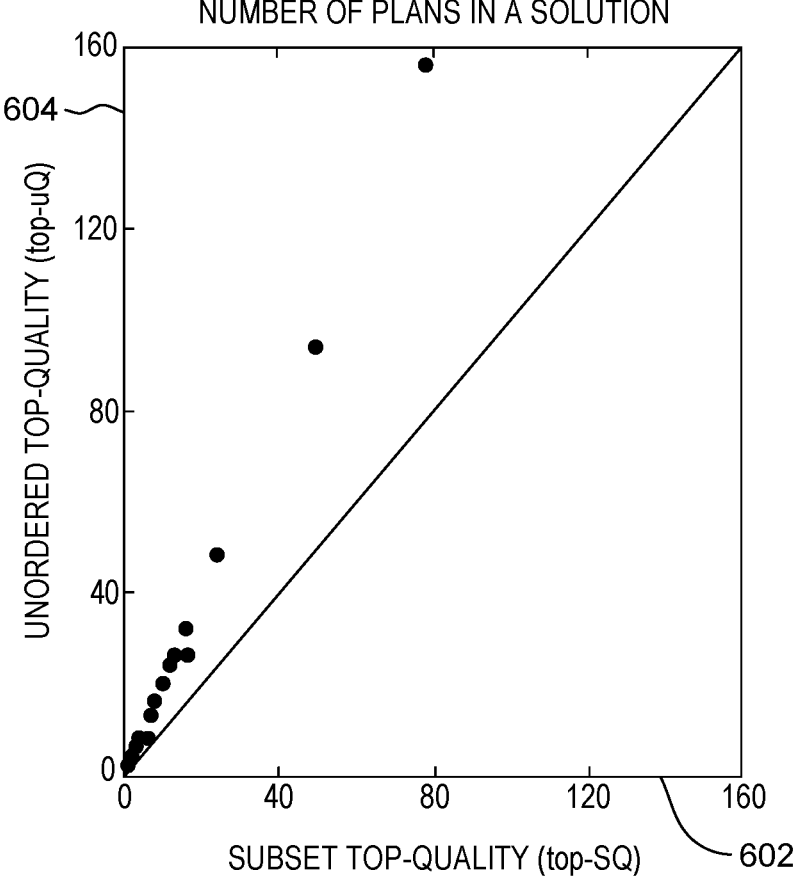
FIG. 6 illustrates another exemplary experimental evaluation of the plan generating module within the computing device of FIG. 1, in accordance with an embodiment of the present disclosure.

FIG. 6 illustrates an exemplary experimental evaluation of plan generating module 110, in accordance with an embodiment of the present disclosure.

In the example of FIG. 6, the number of plans in the solution for the three approaches are compared to verify that the solution sizes indeed decrease. Out of 327 tasks solved by all three approaches, on 277 the plan sets are of the same size. The remaining 50 tasks are depicted in FIG. 6, comparing top-SQ 602 to top-uQ 604. Each point in the plot corresponds to a planning task that was solved by both approaches, and depicting the number of plans in each solution. The 50 tasks depicted in FIG. 6 all belong to the following four domains: ged, pegsol, psr, and spider. For these tasks, the solution size is decreased by half on average.

Figure 7:
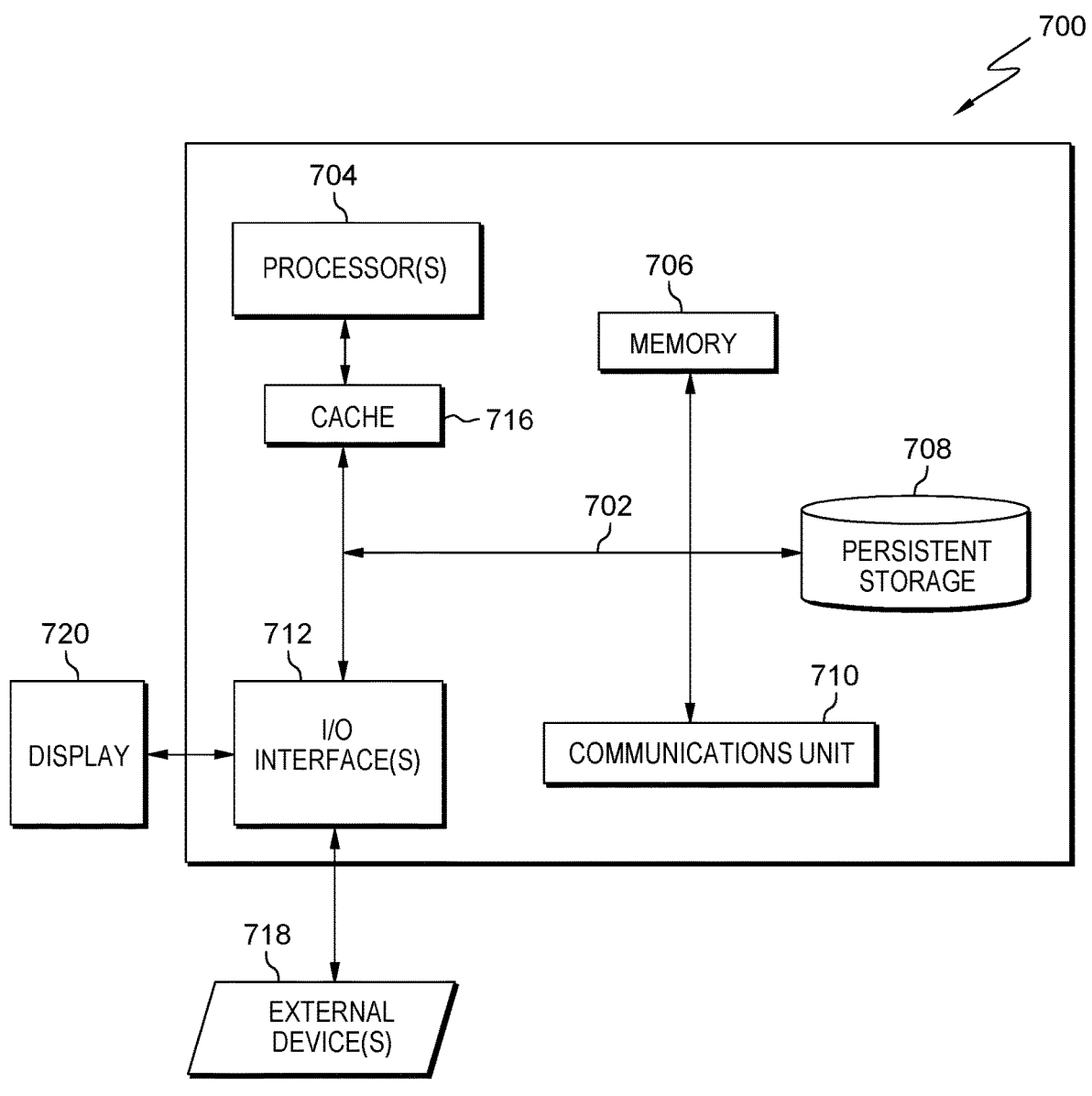
FIG. 7 is a block diagram of components of the computing device of FIG. 1, in accordance with an embodiment of the present disclosure.

FIG. 7 depicts a block diagram 700 of components of computing device 102 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Plan generating module 110 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Plan generating module 110 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., plan generating module 110 can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   formulating, by one or more processors, an artificial intelligence (AI) planning problem represented as a computer-readable model comprising a set of operators;
   executing a planning algorithm, by the one or more processors, to generate a solution set to the AI planning problem comprising one or more plans;
   iteratively reformulating, by the one or more processors, the computer-readable model of the AI planning problem by encoding exclusion conditions such that the planning algorithm cannot generate:

a previously generated plan from a previous iteration; and
   any plan that, for each operator occurring a given number of times in the previously generated plan, includes that operator at least that given number of times; and
   executing the planning algorithm, by the one or more processors, on the iteratively reformulated computer-readable model to generate additional plans until a pre-defined stopping criterion is reached, wherein executing the planning algorithm on the iteratively reformulated computer-readable model reduces a size of the solution set, thereby improving computational efficiency.

2. The computer-implemented method of claim 1, wherein the encoding exclusion conditions further comprises:
   extending to track one or more operators on the previously generated plan;
   modifying and extending the one or more operators to change a value of an extra variable;
   extending an initial state to allocate an initial value to the extra variable; and
   extending a goal to allocate a goal value to the one or more operators and to check the extra variable.

3. The computer-implemented method of claim 1, wherein the iteratively reformulating the computer-readable model of the AI planning problem further comprises:
   forbidding plans that correspond to super-multisets of the one or more plans.

4. The computer-implemented method of claim 1, wherein the pre-defined stopping criterion is selected from the group consisting of: a plan of worse quality than a quality bound is found, enough plans are found, and no more plans exist.

5. The computer-implemented method of claim 1, wherein the planning algorithm is selected from the group consisting of: a cost-optimal planner, an agile planner, a satisficing planner, a top-k planner, a top-quality planner, and a diverse planner.

6. The computer-implemented method of claim 1, further comprising:
   generating a subset top-quality solution in domain with infinite size unordered top-quality solutions.

7. The computer-implemented method of claim 1, further comprising:
   utilizing a cost-optimal planner to generate an updated solution to the AI planning problem based on the pre-defined stopping criterion.

8. A computer program product comprising:
   one or more computer readable storage media, and program instructions collectively stored on the one or more computer readable storage media, the program instructions comprising:
   program instructions to formulate an artificial intelligence (AI) planning problem represented as a computer-readable model comprising a set of operators;
   program instructions to execute a planning algorithm to generate a solution set to the AI planning problem comprising one or more plans;
   program instructions to iteratively reformulate the computer-readable model of the AI planning problem by encoding exclusion conditions such that the planning algorithm cannot generate:
   a previously generated plan from a previous iteration; and any plan that, for each operator occurring a given number of times in the previously generated plan, includes that operator at least that given number of times; and program instructions to execute the planning algorithm on the iteratively reformulated computer-readable model to generate additional plans until a pre-defined stopping criterion is reached, wherein executing the planning algorithm on the iteratively reformulated computer-readable model reduces a size of the solution set, thereby improving computational efficiency.

9. The computer program product of claim 8, wherein the encoding exclusion conditions further comprises:

program instructions to extend to track one or more operators on the previously generated plan;

program instructions to modify and extend the one or more operators to change a value of an extra variable;

program instructions to extend an initial state to allocate an initial value to the extra variable; and program instructions to extend a goal to allocate a goal value to the one or more operators and to check the extra variable.

10. The computer program product of claim 8, wherein the program instructions to iteratively reformulate the computer-readable model of the AI planning problem further comprises:

program instructions to forbid plans that correspond to super-multisets of the one or more plans.

11. The computer program product of claim 8, wherein the pre-defined stopping criterion is selected from the group consisting of: a plan of worse quality than a quality bound is found, enough plans are found, and no more plans exist.

12. The computer program product of claim 8, wherein the planning algorithm is selected from the group consisting of: a cost-optimal planner, an agile planner, a satisficing planner, a top-k planner, a top-quality planner, and a diverse planner.

13. The computer program product of claim 8, further comprising:

program instructions to generate a subset top-quality solution in domain with infinite size unordered top-quality solutions.

14. The computer program product of claim 8, further comprising:

program instructions to utilize a cost-optimal planner to generate an updated solution to the AI planning problem based on the pre-defined stopping criterion.

15. A computer system comprising:

one or more computer processors, one or more computer readable storage media, and program instructions stored on the one or more computer readable storage media for execution by at least one of the one or more computer processors, the program instructions comprising:

program instructions to formulate an artificial intelligence (AI) planning problem represented as a computer-readable model comprising a set of operators;

program instructions to execute a planning algorithm to generate a solution set to the AI planning problem comprising one or more plans;

program instructions to iteratively reformulate the computer-readable model of the AI planning problem by encoding exclusion conditions such that the planning algorithm cannot generate:

a previously generated plan from a previous iteration; and any plan that, for each operator occurring a given number of times in the previously generated plan, includes that operator at least that given number of times; and program instructions to execute the planning algorithm on the iteratively reformulated computer-readable model to generate additional plans until a pre-defined stopping criterion is reached, wherein executing the planning algorithm on the iteratively reformulated computer-readable model reduces a size of the solution set, thereby improving computational efficiency.

16. The computer system of claim 15, wherein the encoding exclusion conditions further comprises:

program instructions to extend to track one or more operators on the previously generated plan;

program instructions to modify and extend the one or more operators to change a value of an extra variable;

program instructions to extend an initial state to allocate an initial value to the extra variable; and program instructions to extend a goal to allocate a goal value to the one or more operators and to check the extra variable.

17. The computer system of claim 15, wherein the program instructions to iteratively reformulate the computer-readable model of the AI planning problem further comprises:

program instructions to forbid plans that correspond to super-multisets of the one or more plans.

18. The computer system of claim 15, wherein the pre-defined stopping criterion is selected from the group consisting of: a plan of worse quality than a quality bound is found, enough plans are found, and no more plans exist.

19. The computer system of claim 15, wherein the planning algorithm is selected from the group consisting of: a cost-optimal planner, an agile planner, a satisficing planner, a top-k planner, a top-quality planner, and a diverse planner.

20. The computer system of claim 15, further comprising:

program instructions to generate a subset top-quality solution in domain with infinite size unordered top-quality solutions.

\* \* \* \* \*